Dec. 23, 1958  M. C. HUNGERFORD  2,865,479
ENGINE STARTER
Filed Jan. 16, 1956
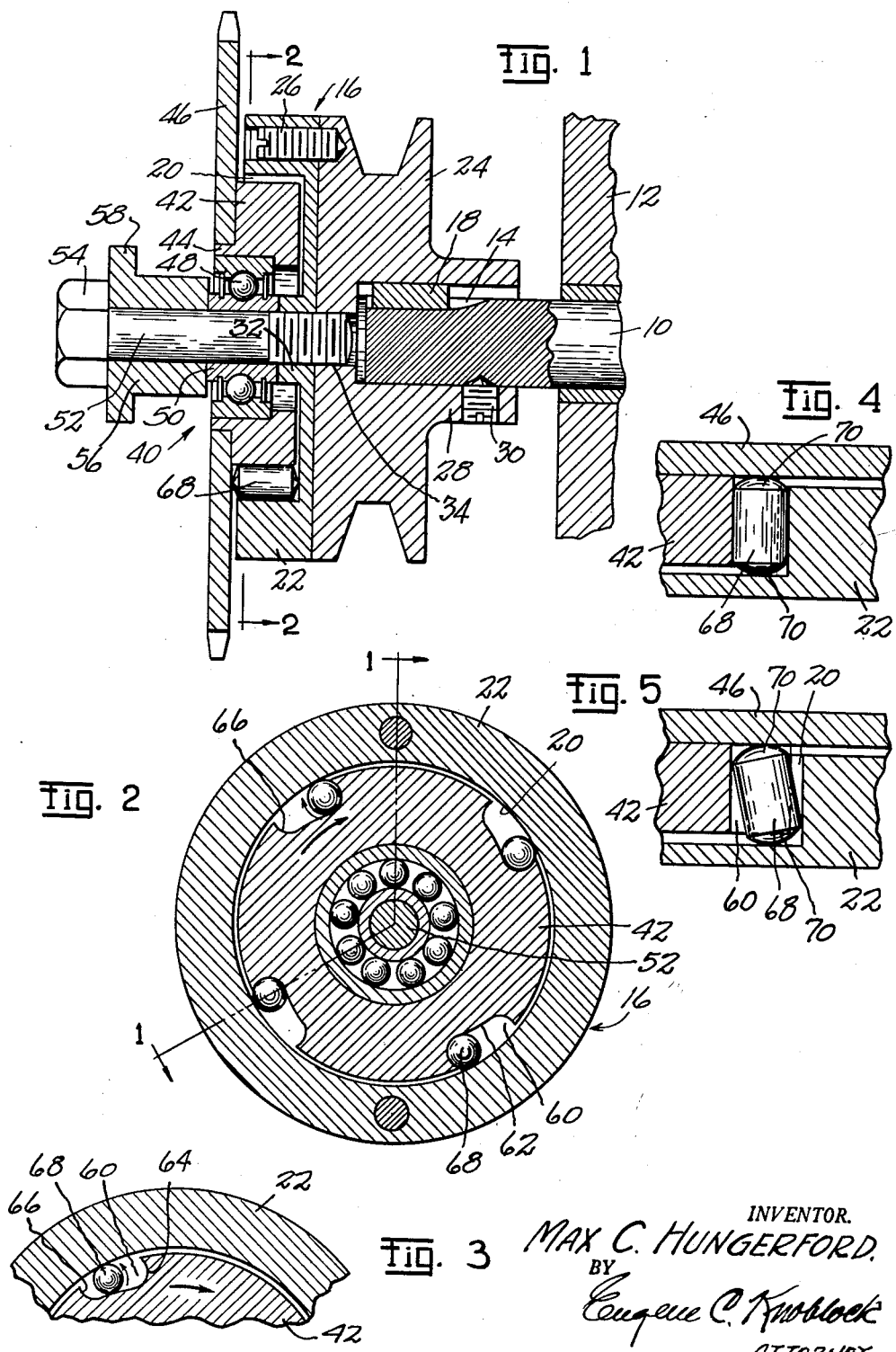
INVENTOR.
MAX C. HUNGERFORD.
BY
Eugene C. Knoblock
ATTORNEY.

United States Patent Office 2,865,479
Patented Dec. 23, 1958

2,865,479
ENGINE STARTER

Max C. Hungerford, Dowagiac, Mich.

Application January 16, 1956, Serial No. 559,399

6 Claims. (Cl. 192—45)

This invention relates to improvements in engine starters for small engines, and more particularly to starters for use on gasoline engines powering implements, such as lawnmowers, small garden tractors and snow plows, and also gasoline engines of outboard marine engines, and on all other devices employing gasoline engines which now commonly require manual starting.

The primary object of this invention is to provide a novel and simple engine starter which can be applied to an engine easily and quickly, and which includes a novel type of overrunning clutch, employing as a clutching element a member having a linear surface contact with associated parts so as to spread wear, due to frictional engagement of the parts, over a long line, rather than limited or substantially spot portions of associated parts.

A further object is to provide a clutch of this character having a novel arrangement of cooperating parts employing rollers as the clutch elements, and providing elongated runways or ramps for such rollers, which ramps are characterized by a very slight deviation from a concentric relation to the periphery of the driven part, so as to provide an effective wedging action of the rollers therein with the driven part for drive transmission therebetween while at the same time preventing sticking or locking of the parts in the wedged driving position.

A further object is to provide a device of this character having novel and simple means for attaching it to an engine drive shaft and having novel means and arrangement of parts for permitting assembly thereof, and having a novel bearing arrangement accommodating relative rotation of the driving and driven parts of the clutch.

A further object is to provide a device of this character wherein rollers serve as drive elements and are centrifugally responsive to accommodate overrunning in one direction and to limit to a minimum lag or differential in speed of rotation as between driving and driven parts, so that drive pick-up will occur as the driven element slows down from an overrunning speed to approximately or only slightly less speed than the rate of speed of the driving element, so as to minimize wear and shock of interengagement of parts during intermittent engine operation during starting.

Other objects will be apparent from the following specification.

In the drawing:

Fig. 1 is an axial sectional view taken on line 1—1 of Fig. 2;

Fig. 2 is a transverse sectional view taken on line 2—2 of Fig. 1;

Fig. 3 is a schematic view illustrating the clutching elements in clutching position;

Fig. 4 is a fragmentary enlarged detail sectional view illustrating a construction adapted principally for an arrangement in which the driving shaft is positioned vertically, and illustrating the parts in driving relation; and Fig. 5 is a view similar to Fig. 4, but illustrating the parts in released or disconnected relation.

Referring to the drawing which illustrates the preferred embodiment of the invention, the numeral 10 designates the drive shaft of an engine which is adapted to project from an engine housing 12 and which will preferably have a splined groove 14 formed in its projecting portion.

A cup-shaped unit is fixedly mounted upon the splined or grooved end of the shaft 10, as by being anchored thereto by means of a spline member 18. The cup-shaped unit is characterized by a concentric cavity 20 of uniform depth throughout the major portion thereof formed in the outer end face thereof and outlined by a rim portion 22. In the form here shown, the cup-shaped unit 16 is composed of a plurality of parts, including the pulley member 24 to which the cavity and rim bearing member is secured by securing means, such as screws 26. The pulley 24 preferably has a projecting collar portion 28 and a set screw, or other securing means 30, carried by the collar and engaging the shaft 10 may cooperate with the spline 18 to hold the cup-shaped unit in place. The cavity 20 will preferably be cylindrical in form and of uniform diameter throughout its depth. The cavity may be interrupted by an annular shouldered offset portion 32 adjacent its center and surrounding a concentric screw-threaded bore 34. The cup-shaped member 16 will constitute the driven unit of the starting device. In this connection the pulley 24 is optional and will be employed as a driving means for driving engine accessories, such as generators, water pumps, cooling fans, etc., in the manner well understood in the art.

A driving unit 40 of the starting device constitutes a disk or circular plate 42 having a rotative clearance in the cavity 20 and of a width or thickness greater than the depth of said cavity, so a portion thereof preferably of reduced diameter, as at 44, will project outwardly of the end surface of the annular portion 22 of the driven member. The projecting member 44 fixedly mounts a sprocket 46 adapted to have trained therearound a chain which extends to a sprocket (not shown) upon an electrical motor (not shown) of high torque suitable for use for engine starting purposes in the manner well understood in the art. The disk 42 preferably mounts a bearing unit or anti-friction member 48, preferably including an inner member 50 of a length to bear against the annular rib 32 when the disk is in operative position and so oriented to the driven member as to position the sprocket 46 clear of the edge of the annular member 22, as viewed in Fig. 1. Note from Fig. 1 also that the member 50 preferably projects slightly beyond the outer face of the disk 42. A bolt having a shank 52 and an enlarged head 54 passes freely through bearing sleeve 50 for threaded engagement and anchorage in the screw-threaded bore 34 of the cup-shaped part 16. A spacer 56 may be interposed between the bolt head 54 and the end of the bearing sleeve 50 to orient the disk 42 in an axial direction without retarding free rotation of the disk 42 relative to the cup-shaped member 16 under the influence of the anti-friction means 48. The spacer 56 is here shown as a member of substantial length having a flange 58 and as such may serve as a hub to accommodate the winding thereon of a cord as is commonly used for manual starting purposes. It will be understood, however, that this relationship of the parts is optional and that the spacer 56 may be completely omitted or may be in the form of a washer or any other element found suitable.

The disk 42 has one or more ramps, cutouts or runways 60 formed in the outer periphery thereof. In the event more than one such ramp is provided, the ramps will preferably be substantially similar and substantially equiangularly displaced. Each of the recesses or runways 60 is circumferentially elongated and of progressively varying depth from end to end thereof, with its deepest portion at the leading end thereof. The ramps will preferably have surfaces 62 which are flat or which may be arcuate on substantially the same radius as would be defined if the elongated ramp was of uniform depth throughout its length but with the radius of curvature somewhat eccentric relative to the center of the disk 42, so as to produce a tapered ramp having a wedging action equivalent of that occurring between straight converging surfaces displaced five degrees or less. The overall length of the ramps or recesses 60 will preferably approximate two times the diameter of the curved end portion of the recess at the end thereof of greatest depth. In this connection, each of the end faces, 64 at the deep end and 66 at the shallow end of the recess, will be of substantially semi-circular extent and configuration.

Each of the recesses 60 receives therein a roller 68 of a length substantially equal to the spacing between the bottom of the cavity 20 and the innermost surface of the sprocket 46. The rollers 68 are characterized by tapered end portions 70 at opposite ends thereof to limit frictional engagement of the end surfaces of the otherwise cylindrical rollers 68 to a limited area and preferably substantially a point area only. It will be understood, however, that the tapered ends of the rollers 68 are not essential and the rollers may have flat ends, in which event they will preferably be of a length not greatly exceeding the depth of the cavity 20 so as to provide clearance between the opposite ends thereof and the bottom of the cavity 20 and the inner face of the sprocket 46, respectively. The diameter of the rollers 68 will preferably be substantially equal to the diameter of the ramp at the deep end 64 thereof and will be so related to the depth of the recess 60 and the clearance between the disk 42 and the cup rim 22 as to have a slight clearance with the inner surface of the rim 22 or the ramp surface 62 in the declutched or free running position of the parts illustrated in Fig. 2 when located at the deep end of the groove. The radius of curvature of the groove surfaces 64 and 66 will preferably be the same as the radius of the rollers 68 so that the rollers may move freely from end to end of said recesses if not restrained by the disk 42. In the preferred form of the device, however, it will be understod that the rate of convergence between the ramp surface 62 and the inner edge of the rim 22 will be such that the roller will wedge at a point spaced from the shallow end 66 of the ramp, as seen in Fig. 3, to effect a driving connection between the parts. The wedged or driving relation of the parts is also illustrated in Fig. 4, while Fig. 5 is an exaggerated view illustrating the rollers 68 at the deep end 64 of the recess 60 in non-driving position with the shaft 10 positioned vertically, so that the roller tilts.

The operation of the device is as follows: When the driver unit 40 is rotated clockwise, as illustrated in Fig. 2, assuming that the engine shaft 10 is in a stationary position, the rotation will cause the rollers 68 to move outwardly and to roll in a counter-clockwise direction, as illustrated in Fig. 3, toward a wedging position frictionally engaging both the ramp surface 62 and the inner surface 23 of the rim 22. As soon as this wedging action occurs, the driven unit 16 is rotated with the driving unit 40, thereby rotating the engine shaft 10 as required to effect starting of the engine, in the manner well understood in the art.

After the engine starts to operate, it soon reaches a speed exceeding the speed of rotation of the driving unit 40 which is usually in the order of 750 R. P. M. As soon as overrunning action occurs, that is, a speed of the driven member 16 exceeding the speed of the driving member 40, the rim 22 of the driven member causes rotation of the rollers 68 in a clockwise direction, as illustrated by the arrow in Fig. 2, thereby moving the rollers circumferentially of the recess 60 in which it is mounted toward the deep end of the recess to release it from driving connection with the driving member. Thereupon, the driving motor can be deenergized, permitting stopping of the disk 42, the same being compensated by the bearing 48, 50 without imposing undue friction upon the operation of the device. When the disk 42 is stopped, the bearings in the uppermost ramps will remain stationary, while those in the lowermost ramps will be permitted to fall by gravity into engagement with the rim surface 23 but to roll freely against said surface by reason of their clearance within the deep ends of the recesses 60.

In the event intermittent starting action should occur, that is, in the event the engine should start and fire only a few cycles and then stop, the starter may be reengaged in an obvious manner. It is important to observe, however, that if this stopping action occurs while the starting motor is still operated, so that both of the driving unit 40 and the driven unit 16 are rotating in the same direction but the driven unit 16 is decelerating, the free operation or relative rotation of these parts will occur only until the speed of the driven unit 16 is reduced to approximately the same speed as the driving unit 40 and thereupon the rollers will reengage and effect a driving action while the driving and driven units are rotating at substantially the same speed. This is very important from the standpoint of producing a smooth operation and one in which shock and wear of the parts is at a minimum and damage to parts is negligible. This smoothness of operation results from the fact that the rotation of the inner member 42 subjects the rollers 68 to centrifugal force so that they are maintained in contact with the inner surface 23 of the rim 22 at all times, and as soon as the speed of rotation of the surface 23 falls even slightly below the speed of rotation of the disk 42, the rollers will immediately be shifted lengthwise in the ramps 60 to a wedging position. This is distinctly different from the operation which occurs if the ramps are formed in the outer member so that centrifugal force acting thereon tends to move the rollers away from driving engagement with the cooperating part, and thereby permits disengagement of the device until a substantial difference in speed exists between the driving and driven members and, in fact, at a speed such that centrifugal force no longer acts upon the rollers and they are free to fall by gravity into engagement with the inner member. Under such conditions, a differential of speed between the driving and driven members in the order of 750 R. P. M. for the driving member and 250 R. P. M. for the driven member may occur before reclutching, and this subjects the prior device to great shock and injury, rapidly wearing the bearings and damaging the cup-shaped member incident to the rapid imposition of heavy shock during restarting operations.

Among other advantages possessed by this construction is the fact that the device will work equally effectively regardless of the position of the shaft 10. Thus the shaft 10 need not be in a horizontal position, but the device will work equally as well if the shaft 10 is located in a vertical position or at any inclination between vertical and horizontal positions. One of the important characteristics in accomplishing this result is illustrated in Fig. 5 wherein it will be seen that, when the axes of the rollers 68 are substantially vertical as incident to a vertical positioning of the shaft 10, the rollers will tilt on their tapered ends 70 when at the deepest ends of the recesses thereof, so as to maintain contact at different parts thereof with both the ramp surface 62 and the cup surface 23. The contact of the rollers with both of these surfaces, even when in free or non-driving relation, renders the device exceedingly sensitive so as to permit the restarting operation to occur during deceleration of the engine and from an overrunning speed incident to intermittent or sputtering starts, as previously described, thereby relieving the device from strain and shock as aforementioned.

It will be observed that the device is simple in construction, compact, requires a minimum number of constituent elements, and is easily disassembled. Another advantage of the device is the free operation thereof, due to the provision of the roller bearing or other antifriction means 48.

While the preferred embodiment of the invention has been illustrated and described herein, it will be understood that changes in the construction may be made within the scope of the appended claims without departing from the spirit of the invention.

I claim:

1. An engine starter adapted to be mounted as a unit upon an engine drive shaft, comprising a cup-shaped driven member having a central cylindrical cavity, means for securing said member to said shaft, a driving unit including a disk, an axial extension on said driven member, a bearing on said extension for journaling said disk for rotation concentrically in said cavity with clearance, said disk having a circumferentially elongated peripheral recess of progressively increasing depth from end to end thereof and being of greatest depth at its leading end, a cylindrical roller in said recess having a diameter less than the radial spacing between the base surface of the recess and the inner surface of the driven member at the deepest end of the recess and greater than the radial spacing between the inner surface of the driven member and the base surface of the shallow end of the groove and drive transmission means carried by said disk.

2. An engine starter adapted to be mounted as a unit upon an engine drive shaft, comprising a cup-shaped driven member having a central cylindrical cavity, means for securing said member on said shaft, a driving unit including a disk, anti-friction means journaling said disk on said driven member for rotation concentrically in said cavity with clearance, said disk having a circumferentially elongated peripheral recess of progressively increasing depth from end to end thereof and being of greatest depth at its leading end, a cylindrical roller in said recess having a diameter less than the radial spacing between the base surface of the recess and the inner surface of the driven member at the deepest end of the recess and greater than the radial spacing between the inner surface of the driven member and the base surface of the shallow end of the groove, said recess having end walls of part cylindrical shape having a radius substantially conforming with the radius of said roller and a drive sprocket carried by the outer face of said disk.

3. An engine starter adapted to be mounted as a unit on an engine drive shaft, comprising a cup-shaped driven member having a central cylindrical cavity, means securing said member on said shaft, a driving unit including a disk rotatable concentrically in and having slight clearance with said cavity, said disk having a circumferentially elongated peripheral recess of progressively increasing depth from end to end thereof and being of greatest depth at its leading end, a cylindrical roller in said recess having a diameter less than the radial spacing between the base surface of the recess and the inner surface of the driven member at the deepest end of the recess and greater than the radial spacing between the inner surface of the driven member and the base surface of the shallow end of the groove, said recess having an arcuate bottom surface slightly eccentric of said disk to progressively converge with the inner surface of said cup-shaped member from end to end thereof in counter-rotational direction a hub positioned outwardly and concentrically of said disk, said means carried by said driven member for mounting said hub and journaling said disk, said last named means including an anti-friction bearing.

4. An engine starter adapted to be mounted as a unit on an engine drive shaft, comprising a cup-shaped driven member having a central cylindrical cavity, means securing said member on said shaft, a driving unit including a disk, a bearing carried by said driven member and journaling said disk for rotation concentrically in said cavity with clearance, said disk having a plurality of circumferentially elongated peripheral recesses of progressively increasing depth from end to end thereof and being of greatest depth at its leading end, a cylindrical roller in each recess having a diameter less than the radial spacing between the base surface of the recess and the inner surface of the driven member at the deepest end of the recess and greater than the radial spacing between the inner surface of the driven member and the base surface of the shallow end of the groove, said recesses being spaced substantially uniformly circumferentially, and a drive transmission member carried by the outer face of said disk and confining said rollers.

5. An engine starter adapted to be mounted as a unit on an engine drive shaft, comprising a cup-shaped driven member having a central cylindrical cavity, means for securing said member on said shaft, a driving unit including a disk, a bearing carried by said driven member journaling said disk for rotation concentrically in said cavity with clearance, said disk having a circumferentially elongated peripheral recess of progressively increasing depth from end to end thereof and being of greatest depth at its leading end, a cylindrical roller in said recess having a diameter less than the radial spacing between the base surface of the recess and the inner surface of the driven member at the deepest end of the recess and greater than the radial spacing between the inner surface of the driven member and the base surface of the shallow end of the groove, said recess having a length not substantially less than twice the diameter of said roller and a drive transmission member carried by the outer face of said disk and projecting radially therefrom to confine said roller in said recess.

6. An engine starter adapted to be mounted as a unit on an engine drive shaft, comprising a cup-shaped driven member having a central culindrical cavity, means securing said member on said shaft, a driving unit including a disk journaled on said shaft, said disk being rotatable concentrically in and having slight clearance with said cavity, a bearing carried by said driven member and ing said member on said shaft, a driving unitincluding elongated peripheral recess of progressively increasing depth from end to end thereof and being of greatest depth at its leading end, and a cylindrical roller in said recess having a diameter less than the radial spacing between the base surface of the recess and the inner surface of the driven member at the deepest end of the recess and greater than the radial spacing between the inner surface of the driven member and the base surface of the shallow end of the groove, said driving member including a part spanning the cavity of said driven member and closing the end of said recess to confine said roller.

References Cited in the file of this patent

UNITED STATES PATENTS

| 455,549 | Sternoff-Beyer | July 7, 1891 |
| 681,523 | Very | Aug. 27, 1901 |
| 2,079,527 | Rauen | Sept. 13, 1930 |
| 2,286,419 | Krenzke | June 16, 1942 |
| 2,762,483 | Clark | Sept. 11, 1956 |

FOREIGN PATENTS

| 1,023,045 | France | Dec. 24, 1952 |